United States Patent [19]

Mese

[11] 4,441,524

[45] Apr. 10, 1984

[54] BALL VALVE

[75] Inventor: Hisayoshi Mese, Osaka, Japan

[73] Assignee: Fuji Kinzoku Kohsaku Co. Ltd., Osaka, Japan

[21] Appl. No.: 305,851

[22] Filed: Sep. 25, 1981

[30] Foreign Application Priority Data

Oct. 2, 1980 [JP] Japan ................................ 55-138576

[51] Int. Cl.³ .............................................. F16K 5/06
[52] U.S. Cl. ................................. 137/625.47; 251/315; 251/316
[58] Field of Search .............................. 251/315, 316; 137/625.47

[56] References Cited

U.S. PATENT DOCUMENTS

| 1,784,381 | 12/1930 | O'Stroske | 251/315 X |
| 2,885,179 | 5/1959 | Hartmann | 251/315 |
| 3,236,495 | 2/1966 | Buchholz | 251/315 X |
| 3,735,956 | 5/1973 | Matousek | 251/315 |

OTHER PUBLICATIONS

Pacific Valves, Inc., *3 Way-Multiport Ball Valves*, Oct. 1, 1970.

Primary Examiner—Arnold Rosenthal
Attorney, Agent, or Firm—Armstrong, Nikaido, Marmelstein & Kubovcik

[57] ABSTRACT

A ball valve includes a valve seat assembly having a lower valve seat, an upper valve seat, packings located in openings formed by apertures in abutting sides of the valve seats, and annular retainers located in central holes through the packings. Each of the components has a profiled inner surface for slidable contact with the ball controlling communication between the fluid passages in the valve box. The use of such components for the valve seat simplifies manufacture, gives a wider choice of materials to be used and reduces costs of repairs.

3 Claims, 9 Drawing Figures

BALL VALVE

BACKGROUND OF THE INVENTION

This invention relates to a ball valve.

In one type of ball valve heretofore in use, the valve seat is formed so as to have, in combination, the functions of valve seat, packing and retainer, and is highly effective in view of simplifying valve assembly.

However, the seat becomes very complicated in shape and structure making it exceedingly difficult to machine the spherical surface of the valve seat. Consequently, the valve seat of the type described has the disadvantage that maintaining machining accuracy in individual parts becomes difficult and not only the valve seat and its vicinity are subject to leakage, but also machining becomes troublesome, resulting in difficulty in reduction of production cost.

When the valve seat becomes worn or damaged, the whole of the valve seat, high in machining cost, has to be replaced with the disadvantageous result in increased repair cost.

SUMMARY OF THE INVENTION

It is an object of this invention to obviate or mitigate the disadvantages inherent in the ball valves of the type described by providing a ball valve which is capable of preventing leakage due to maladjustment of machining accuracy and which, in addition, renders it possible to reduce repair cost and facilitate working.

According to the present invention there is provided a ball valve comprising a valve seat assembly locatable within a valve box, the latter being provided with at least two fluid passages and with a valve chamber open at one end, the valve seat assembly comprising a rod-carrying ball provided with a through-hole for enabling communication between said passages, charcterized by a lower valve seat having a concave surface for slidable contact with a lower portion of the ball and formed with semicircular packing insertion apertures on opposed upper side surfaces, an upper valve seat into which the rod is inserted to be assembled, the upper valve seat having a concave surface for slidable contact with an upper portion of the ball and formed with semicircular packing insertion apertures on opposed lower side surfaces, packings each being locatable in an opening formed by packing insertion apertures when the valve seats are assembled, and having a concave front surface for slidable contact with the ball as well as a convex rear surface for slidable contact with an outer peripheral surface of the valve chamber, and annular retainers locatable in retainer insertion holes of the packings and each having a front concave surface for slidable contact with the ball as well as a convex rear surface for slidable contact with the outer peripheral surface of the valve chamber, the valve rod passing through the upper valve seat to bring an upper surface of the seat into butting relation with a packing gland fitted with a bearing packing, and the bearing packing and the packing gland being tightened by means of a packing gland screw.

The invention will be described in greater detail with reference to the accompanying drawings.

DESCRIPTION OF THE PREFERRED EMBODIMENT

Figure 1:
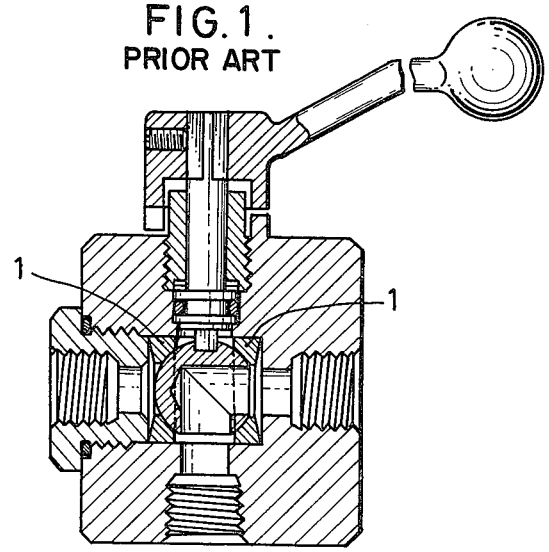
FIG. 1 shows a conventional valve seat for a ball valve.

Referring to FIG. 1 of the drawings, a conventional ball valve has a valve seat 1 formed as a body having the combined functions of valve seat, packing and retainer.

Figure 2:
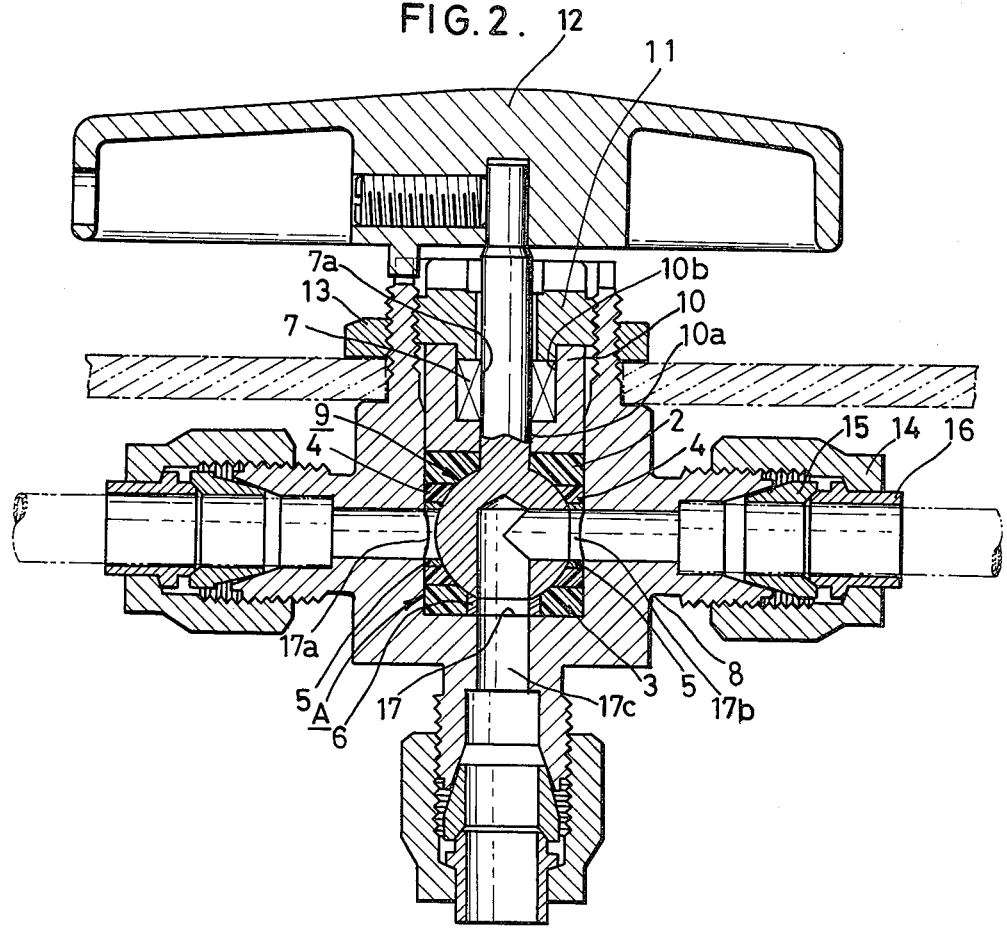
FIG. 2 is a view in longitudinal sectional of a ball valve according to the invention.
Figure 3:
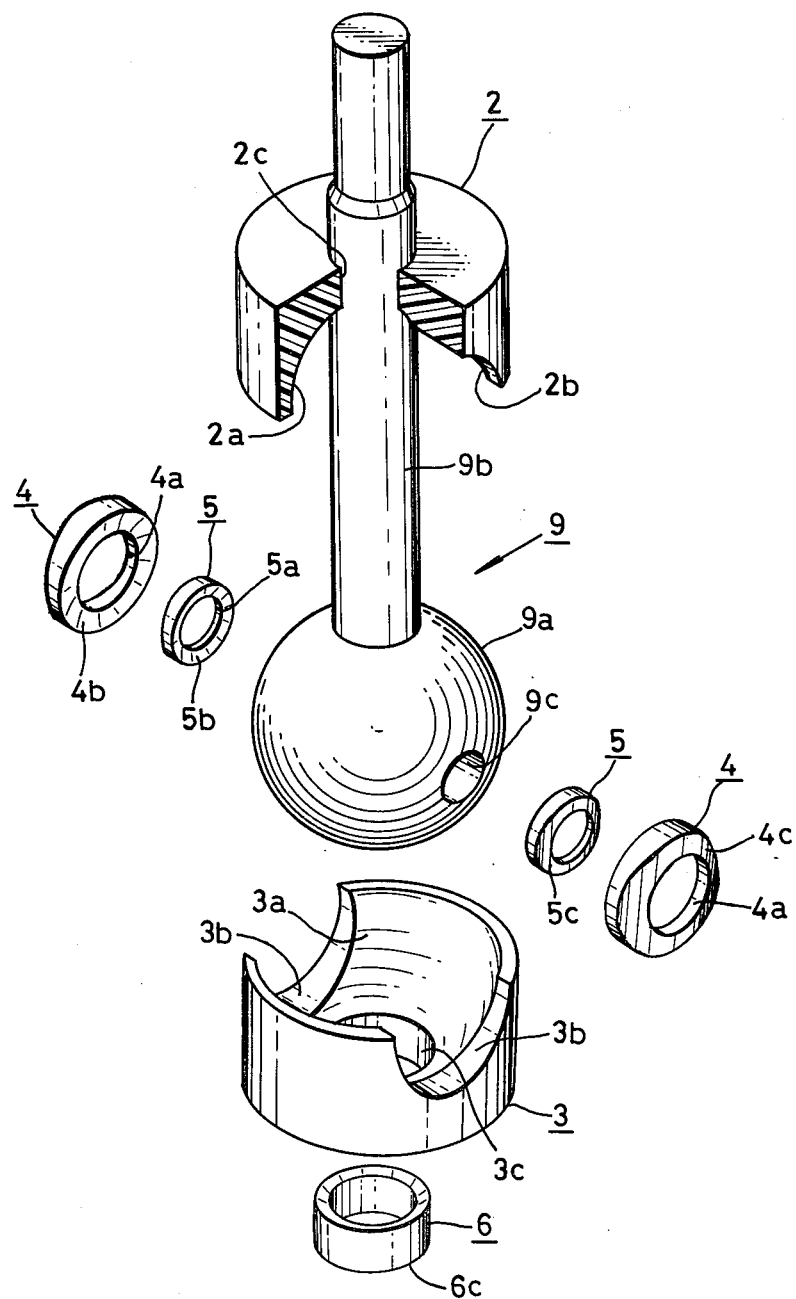
FIG. 3 is an exploded perspective view of a valve seat assembly and a rod-carrying ball for the valve of FIG. 2.
Figure 4:
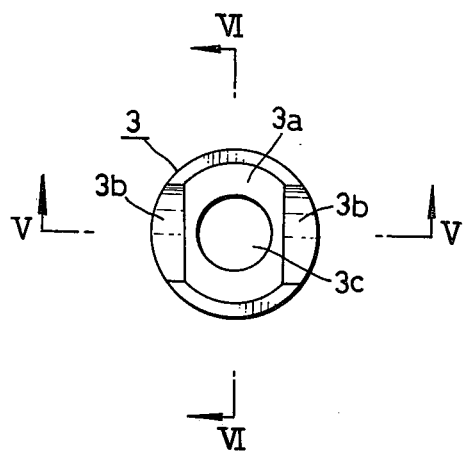
FIG. 4 is a plan view of a lower valve seat.
Figure 7:
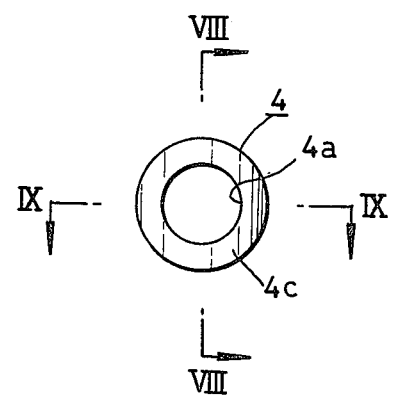
FIG. 7 is a plan view of a retainer.
Figure 5:
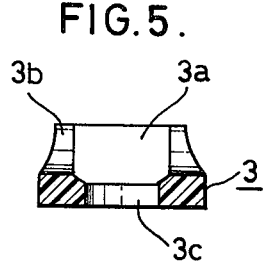
FIG. 5 is a sectional view taken along the line V—V of FIG. 4.
Figure 8:
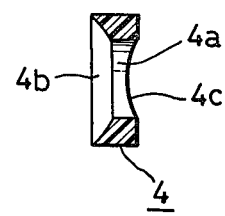
FIG. 8 is a sectional view taken along the line VIII—VIII of FIG. 7.
Figure 6:
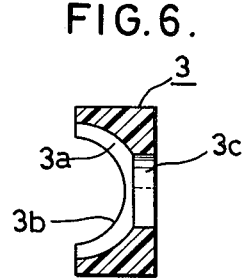
FIG. 6 is a sectional view tkane along the line VI—VI of FIG. 4.
Figure 9:
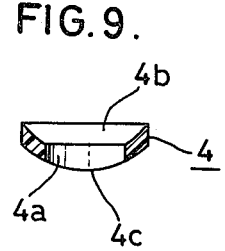
FIG. 9 is a sectional view taken along the line IX—IX of FIG. 7.

As shown in the other figures of the drawings, a ball valve has a valve seat A separated into an upper valve seat 2, a lower seat 3, packings 4, retainers 5 and a lower retainer 6 as shown in FIGS. 2 and 3 and using a bearing packing 7 superior in lubricativity to hold a valve rod.

A detailed description will now be given of the invention with reference to a preferred embodiment thereof shown in FIGS. 2 to 9. Incidentally, it should be understood that the invention is not limited to the structure of the embodiment shown but may be modified to suitable other structures without departing from the scope and spirit of the invention.

FIG. 2 is a longitudinal sectional view of a ball valve according to the invention. In the figure, the numeral 8 designates a valve box; 9 a rod-carrying ball; 10 a packing gland; 11 a packing gland screw; 12 a handle; 13 a lock nut; 14 a cap nut; 15 a front ring; and 16 designates a back ring.

The valve box 8 is made of stainless steel and is formed in the middle with a cylindrical valve chamber 17 open on the upside. Fluid passages 17a, 17b and 17c are in communication with the valve chamber 17 from right and left and below.

The rod-carrying ball 9 is of the type in which a ball 9a is formed integral with a valve rod 9b and the material used in the ball 9a and rod 9b is SUS 316. The ball 9a is formed with a through-hole 9c for providing communication between the passages of the valve box 8.

The lower seat 3, as shown in FIGS. 3 and 4 to 6, is formed in such a manner that a cylindrical body is cut inwardly thereof to provide a semispherical surface 3a and is formed on the upside of both sides with semicircular insertion holes 3b for receiving thereinto packings 4 and at the bottom with a circular insertion hole 3c for inserting a lower retainer 6. The lower valve seat 3 is made of hard polytetrafluoroethylene, and the material used may vary suitably in accordance with the physical properties of fluid.

The upper valve seat 2 is of entirely the same structure as the lower valve seat 3 except that the diameter of the valve rod insertion hole 2c is different from that of the retainer insertion hole 3c of the lower valve seat 3. The front side of the upper valve seat 2 is formed into a concave surface 2a which comes into slidable contact with the ball 9a, and the seat 2 is provided on both lower sides with semicircular holes 2b for inserting packings.

The upper valve seat 2 and lower valve seat 3 are mated with each other in an opposed relation from upper and lower sides to surround the ball 9a and are formed on both sides with circular insertion holes for inserting packing 4 therethrough.

The packings 4, as shown in FIGS. 3 and 7 to 9, are formed ringlike, and are formed in the middle with insertion holes 4a for inserting retainers 5 therethrough, respectively. The inside surface of the packing 4 is formed into a concave surface 4b adapted to come into slidable contact with the ball 9a and the outside of the seat 4 is formed into a convex surface 4c corresponding to the inner peripheral surface of a valve chamber 17.

The packings 4 are made of hard polytetrafluoroethylene, and the material used may suitably vary with the kind of fluid. This is the same as the case of the valve seats 2 and 3.

The retainers 5 are of substantially the same structure as the packings 4 and the outer diameters of the retainers are substantially the same as the sizes of the retainer insertion holes 4a of the packings 4 and are formed into ring shapes having fluid passages 5a in the middle thereof, respectively.

The inside surface of the retainer is machined into a concave surface 5b which comes into slidable contact with the ball 9a, and the outside surface thereof is formed into a convex surface 5c corresponding to the inner peripheral surface of a valve chamber 17.

The lower retainer 6 is substantially the same in construction as the retainers 5 except that the bottom surface 6c of the retainer 6 is planar. The retainer 5 and 6 are made of SUS 316, and it is to be understood that the material may suitably be changed.

A packing gland 10 is a cylindrical body having a valve rod insertion hole 10a passed through the middle thereof, and is provided on the upper portion thereof with a packing insertion cavity 10b for receiving a bearing packing thereinto.

The bearing 7 is made of polytetrafluoroethylene resin excellent in lubricity and is provided in the middle thereof with a hole 7a for passing a valve rod 9b therethrough.

Now, a description will be given of an assembly of the ball valve according to the invention and of the function and effect of the valve.

Referring to FIGS. 2 and 3, first a lower retainer 6 is inserted into a lower valve seat 3, and then a ball 9a is inserted into the lower valve seat 3 in the state of a through-hole 9c being maintained in position. Thereafter, packings 4 and retainers 5 are assembled and inserted into packing insertion holes 3b of the lower valve seat 3. Thereafter, the assembled body in question is inserted into a valve chamber 17 from above and a valve rod 9b is caused to go through the upper valve seat 2, so that the outer peripheral surface of the ball 9a may be completely surrounded. Further, a packing gland 10 is inserted such that the rod 9b passes therethrough and a bearing packing is interposed and finally a packing gland screw 11 is suitably tightened to complete the intended assembly.

Since the invention is of the construction described above, it has numerous excellent effects that follow:
(1) Since the valve seat assembly A is constructed as a composite body of valve seats 2 and 3, packings 4 and retainers 5 and 6, the parts of the assembly A are simplified in shape to facilitate machining and at the same time the individual parts are improved also in machining accuracy and are small in variation. As a result, there is caused no leak due to maladjustment of machining accuracy of parts, and in addition, machining cost of the valve seat can be reduced in a substantial degree.
(2) Since the material used in each part of the valve seat can suitably be changed in accordance with the kind, flow rate, pressure, temperature, etc. of fluid, a material most suitable for fluid properties can be used in each part, which is advantageous for the prevention of leak, prolongation of service life, and reduction in production cost.
(3) When the valve seat assembly gets worn or damaged, the damaged parts thereof alone can individually be replaced. Accordingly, repair expenses can be reduced in a substantial degree as compared with the conventional practice which made it necessary to replace the whole of the valve seat assembly.
(4) Since the valve is constructed such that a bearing packing 7 excellent in lubricativity is inserted into the cavity 10b of a packing gland 10 in the state of a valve rod 9b being inserted, the valve rod 9b is excellent in centrality and is also assured of very smooth rotation. Furthermore, adjustment of tightening of a packing gland screw 11 makes it very simple to repair a leak and the like.

As described above, the invention is highly useful in that it provides least possibility of a leak and enables low cost of production and repairing.

What is claimed is:
1. A ball valve comprising a valve seat assembly locatable within a valve box, the latter being provided with at least two fluid passages and with a valve chamber open at one end, the valve seat assembly comprising a rod-carrying ball provided with a through-hole for enabling communication between said passages, characterized by a lower valve seat having a concave surface for slidable contact with a lower portion of the ball and formed with semicircular packing insertion apertures on opposed upper side surfaces, an upper valve seat into which the rod is inserted to be assembled, the upper valve seat having a concave surface for slidable contact with an upper portion of the ball and formed with semicircular packing insertion apertures on opposed lower side surfaces, packings each being locatable in an opening formed by packing insertion apertures when the valve seats are assembled, and having a concave front surface for slidable contact with the ball as well as a convex rear surface for slidable contact with an outer peripheral surface of the valve chamber, and annular retainers locatable in retainer insertion holes of packings and each having a front concave surface for slidable contact with the ball as well as a convex rear surface for slidable contact with the outer peripheral surface of the valve chamber, the annular retainers being made of a harder material than the packings and the retainers together with the valve box, the upper and lower valve seats and the ball totally encasing the packings, the valve rod passing through the upper valve seat to bring an upper surface of the seat into butting relation with a packing gland fitted with a bearing packing, and the bearing packing and the packing gland being tightened by means of a packing gland screw.

2. A ball valve according to claim 1, characterized in that a three-way passage is formed by a retainer insertion hole provided in the lower valve seat and a lower circular retainer locatable into said hole, the lower retainer being formed at an upper side into a concave surface for slidable contact with the ball.

3. A ball valve according to claim 1 and 2, characterized in that the upper and lower valve seats are made of hard polytetrafluoroethylene.

* * * * *